United States Patent
Sun et al.

(10) Patent No.: US 12,447,797 B2
(45) Date of Patent: Oct. 21, 2025

(54) AMBIENT HUMIDITY VIRTUAL SENSOR

(71) Applicant: GM GLOBAL TECHNOLOGY OPERATIONS LLC, Detroit, MI (US)

(72) Inventors: Min Sun, Troy, MI (US); David Eugene Edwards, Rochester Hills, MI (US); Cameron Paul Smith, Milford, MI (US); Rupesh Sonu Kakade, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 219 days.

(21) Appl. No.: 18/313,449

(22) Filed: May 8, 2023

(65) Prior Publication Data
US 2024/0375480 A1    Nov. 14, 2024

(51) Int. Cl.
*B60H 1/00* (2006.01)
*B60H 1/32* (2006.01)

(52) U.S. Cl.
CPC ....... *B60H 1/00785* (2013.01); *B60H 1/0073* (2019.05); *B60H 2001/3252* (2013.01); *B60H 2001/3261* (2013.01); *B60H 2001/3263* (2013.01)

(58) Field of Classification Search
CPC ............ B60H 1/00785; B60H 1/0073; B60H 1/3211; B60H 1/00278; B60H 2001/3252; B60H 2001/3261; B60H 2001/3263; B60H 2001/00307; B60H 2001/3272
See application file for complete search history.

(56) References Cited

U.S. PATENT DOCUMENTS

| | | | | |
|---|---|---|---|---|
| 11,039,551 | B1* | 6/2021 | Bailey | H05K 7/20145 |
| 2001/0010261 | A1* | 8/2001 | Oomura | B60K 6/48 165/42 |
| 2006/0086111 | A1* | 4/2006 | Kang | F24F 11/84 62/176.6 |
| 2015/0343881 | A1* | 12/2015 | Farrington | B60H 3/022 62/121 |
| 2020/0398636 | A1* | 12/2020 | He | B60H 1/00507 |

FOREIGN PATENT DOCUMENTS

| | | | | |
|---|---|---|---|---|
| CN | 101048627 A | * | 10/2007 | F24F 11/86 |
| WO | WO-2011111949 A2 | * | 9/2011 | B60L 1/003 |

OTHER PUBLICATIONS

Rasmussen et al., Dynamic Modeling & Advance Control of Air Conditioning and Refrigeration System, Jun. 2006, ACRC TR-224 (Year: 2006).*

* cited by examiner

*Primary Examiner* — Emmanuel E Duke
(74) *Attorney, Agent, or Firm* — CANTOR COLBURN LLP

(57) ABSTRACT

A method of operating a cooling system of a vehicle includes measuring a refrigerant pressure and a refrigerant temperature of a flow of refrigerant in a refrigerant circuit of the cooling system, estimating a relative humidity of a supply airflow across an evaporator of the refrigerant circuit utilizing the measured refrigerant pressure and the measured refrigerant temperature, and changing operation of one or more components of the refrigerant circuit as a result of the estimated relative humidity.

18 Claims, 3 Drawing Sheets

AMBIENT HUMIDITY VIRTUAL SENSOR

INTRODUCTION

The subject disclosure relates to vehicles, and in particular to cabin heating, ventilation and air conditioning systems for vehicles.

Ambient relative humidity level significantly impacts required cooling power needed to cool a vehicle cabin to a desired temperature. For example, for a cabin air temperature reduction from 35 Celsius to 15 Celsius, ambient conditions having a relative humidity of 50% can increase required cooling power or load by 100%, compared to cooling power required in conditions having lower ambient relative humidity. Additionally, vehicle systems such as battery thermal energy management systems utilize measured or estimated relative humidity to manage their operation.

SUMMARY

In one exemplary embodiment, a method of operating a cooling system of a vehicle includes measuring a refrigerant pressure and a refrigerant temperature of a flow of refrigerant in a refrigerant circuit of the cooling system, estimating a relative humidity of a supply airflow across an evaporator of the refrigerant circuit utilizing the measured refrigerant pressure and the measured refrigerant temperature, and changing operation of one or more components of the refrigerant circuit as a result of the estimated relative humidity.

In addition to one or more of the features described herein, the relative humidity is estimated utilizing a 2-zone moving boundary refrigerant dynamic model.

In addition to one or more of the features described herein, the results of the refrigerant dynamic model are filtered via a Kalman filter.

In addition to one or more of the features described herein, a supply airflow temperature at the evaporator is estimated.

In addition to one or more of the features described herein, the supply airflow temperature is estimated via a 2-zone static air model with humidity condensation.

In addition to one or more of the features described herein, the measured refrigerant pressure is an evaporator outlet pressure, and the measured refrigerant temperature is an evaporator outlet temperature.

In addition to one or more of the features described herein, one or more of ambient air temperature, ambient air pressure or refrigerant flow rate are utilized in the estimating of relative humidity.

In addition to one or more of the features described herein, the one or more components include one or more of a compressor, an expansion device, a blower or a condenser fan.

In addition to one or more of the features described herein, the cooling system further comprises a chiller disposed along the refrigerant circuit. The chiller is fluidly connected to a coolant circuit configured to condition a rechargeable energy storage system.

In addition to one or more of the features described herein, operation of one or more components of the coolant circuit is changed in response to the estimated relative humidity.

In another exemplary embodiment, a cooling system of a vehicle includes a refrigerant circuit having a flow of refrigerant circulating therethrough. The refrigerant circuit includes a compressor, an evaporator, one or more refrigerant pressure sensors, and one or more refrigerant temperature sensors. A refrigerant circuit controller is operably connected to the refrigerant circuit. The refrigerant circuit controller is configured to estimate a relative humidity of a supply airflow across the evaporator utilizing a measured refrigerant pressure and a measured refrigerant temperature, and change operation of one or more components of the refrigerant circuit as a result of the estimated relative humidity.

In addition to one or more of the features described herein, the refrigerant circuit controller is configured to estimate the relative humidity utilizing a 2-zone moving boundary refrigerant dynamic model.

In addition to one or more of the features described herein, the refrigerant circuit controller is configured to filter the results of the refrigerant dynamic model via a Kalman filter.

In addition to one or more of the features described herein, the refrigerant circuit controller is configured to estimate a supply airflow temperature at the evaporator.

In addition to one or more of the features described herein, the refrigerant circuit controller is configured to estimate the supply airflow temperature via a 2-zone static air model with humidity condensation.

In addition to one or more of the features described herein, the measured refrigerant pressure is an evaporator outlet pressure, and the measured refrigerant temperature is an evaporator outlet temperature.

In addition to one or more of the features described herein, the refrigerant circuit controller is configured to utilize one or more of ambient air temperature, ambient air pressure or refrigerant flow rate in the estimating of relative humidity.

In addition to one or more of the features described herein, the one or more components include one or more of the compressor, an expansion device, a blower or a condenser fan.

In addition to one or more of the features described herein, the cooling system further includes a chiller located along the refrigerant circuit. The chiller is fluidly connected to a coolant circuit configured to condition a rechargeable energy storage system.

In addition to one or more of the features described herein, operation of one or more components of the coolant circuit is changed in response to the estimated relative humidity.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
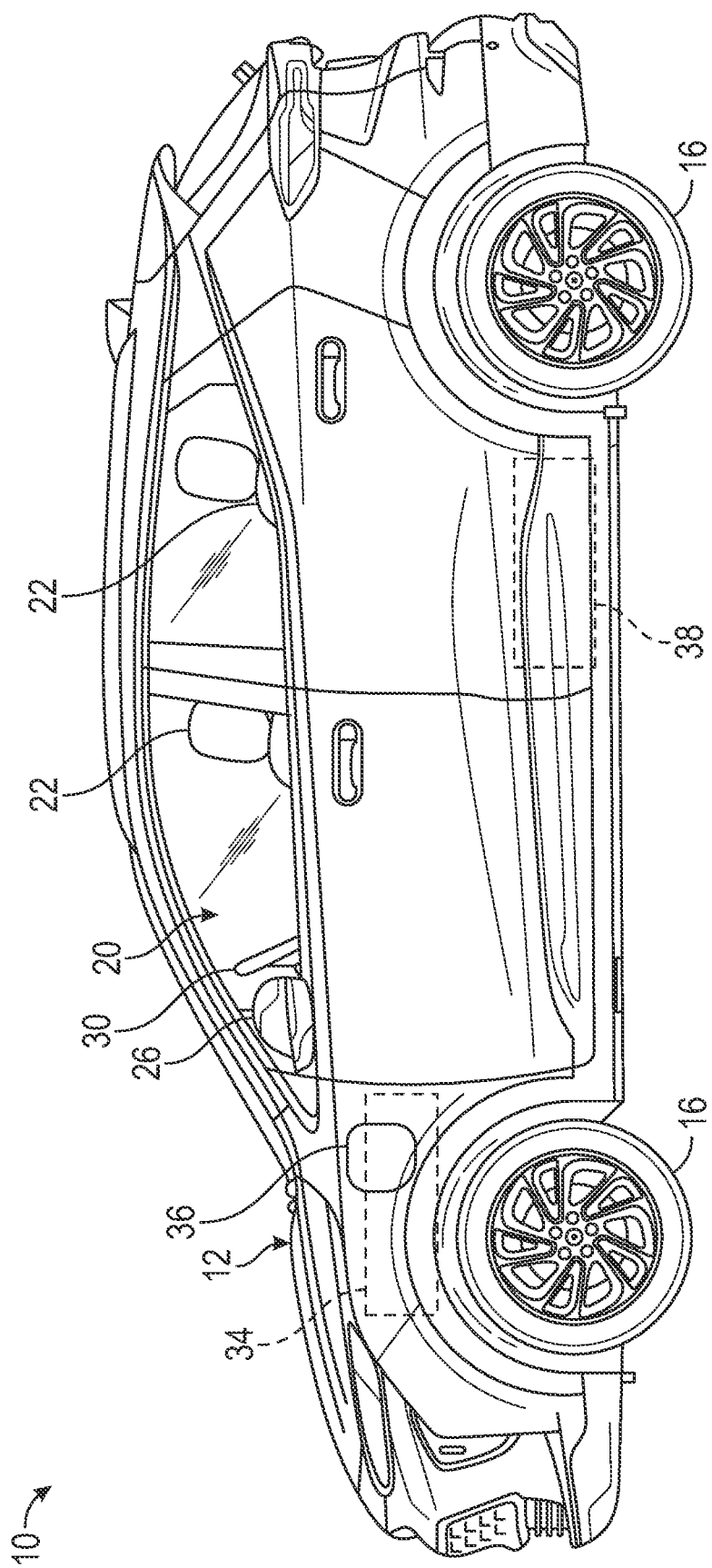
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment a vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. That is, changing a position of two of the plurality of wheels 16 relative to body 12 will cause vehicle 10 to change direction. Body 12 defines, in part, a passenger compartment 20 having seats 22 positioned behind a dashboard 26. A steering control 30 is arranged between seats 22 and dashboard 26. Steering control 30 is operated to control orientation of the steerable wheel(s). Vehicle 10 includes an electric motor 34 connected to a transmission 36 that provides power to one or more of the plurality of wheels 16. A rechargeable energy storage system (RESS) 38 or battery assembly provides power to electric motor 34.

Figure 2:
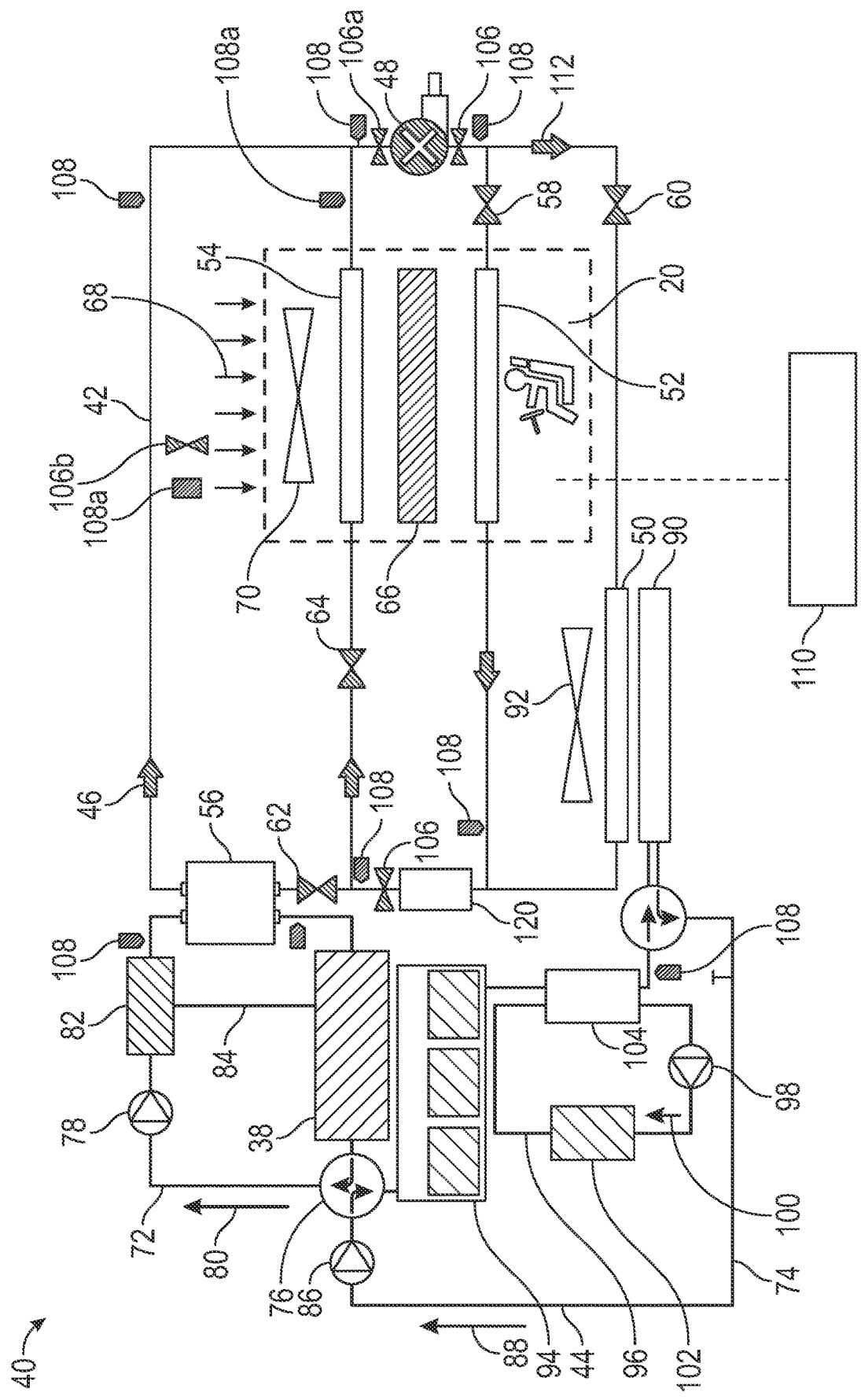
FIG. 2 is a schematic illustration of an embodiment of a cooling system of a vehicle.

Referring now to FIG. 2, a cooling system 40 is operably connected to the RESS 38 for thermal management of the RESS 38, and for thermal management of the passenger compartment 20. The cooling system 40 includes a refrigerant circuit 42 and a coolant circuit 44, which are configured to exchange thermal energy between the refrigerant circuit 42 and the coolant circuit 44, and to condition the passenger compartment 20 and also to cool the RESS 38. The refrigerant circuit 42 includes a flow of refrigerant 46 circulating therethrough. The circulation of the flow of refrigerant 46 is driven by a compressor 48, with the refrigerant circuit 42 also including an outside condenser 50, a condenser heater 52 arranged in a fluidly parallel relationship, and an evaporator 54 and a chiller 56 arranged in a fluidly parallel relationship with each other. Condenser heater valve 58 and outside condenser valve 60 are positioned along the refrigerant circuit 42 to selectably direct the flow of refrigerant 46 through the condenser heater 52 and/or the outside condenser 50. Similarly, chiller valve 62 and evaporator valve 64 are located along the refrigerant circuit 44 to selectably direct the flow of refrigerant 46 through the chiller 56 and/or the evaporator 54. The condenser heater 52 and the evaporator 54 selectably provide cooling airflow via the evaporator 54 or heating airflow via the condenser heater 52 to the passenger compartment 20 through an air door 66. To provide the cooling airflow or the heating airflow, a supply airflow 68 is urged across the evaporator 54 and/or the condenser heater 52 by a blower 70 and through the air door 66 into the passenger compartment 20.

The coolant circuit 44 includes a first coolant loop 72 and a second coolant loop 74, which are interconnected by a coolant valve 76. Operation of the coolant valve 76 allows for the first coolant loop 72 to be isolated from the second coolant loop 74, or alternatively to combine the first coolant loop 72 with the second coolant loop 74 allowing for combining or mingling the flow of coolant therethrough. The first coolant loop 72 includes a first coolant pump 78 to direct a first flow of coolant 80 along the first coolant loop 72 and through the chiller 56, where the first flow of coolant 80 exchanges thermal energy with the flow of refrigerant 46 to cool the first flow of coolant 80. The first flow of coolant 80 is directed to the RESS 38 to condition the RESS 38. While is some modes of operation the RESS 38 is cooled by the first flow of coolant 80, in some modes of operation it may be desired to heat the first flow of coolant 80 in order to heat the RESS 38. As such, in some embodiments the first coolant loop 72 includes a heater 82 through which the first flow of coolant 80 may be directed to heat the RESS 38 and a chiller bypass passage 84 so that when the heater 82 is operated, the first flow of coolant 80 bypasses the chiller 56 and flows from the heater 82 to the RESS 38.

The second coolant loop 74 includes a second coolant pump 86 to urge a second flow of coolant 88 along the second coolant loop 74. The second coolant loop 74 includes a low temperature radiator 90 from which thermal energy is dissipated from the second flow of coolant 88 by an airflow directed across the low temperature radiator 90 by a fan 92. The second flow of coolant 88 is directed across one or more power electronics components 94, such as a single-phase induction motor (SPIM), an auxiliary power module (APM), and/or an on-board charging module (OBCM) to cool the power electronics components 94. In some embodiments, the coolant circuit 44 further includes an oil loop 96 using an oil pump 98 to drive a flow of oil 100 therethrough. The flow of oil 100 is directed through a drive unit 102 to cool the drive unit 102. The heat is rejected via a heat exchanger 104 at which the flow of oil 100 exchanges thermal energy with the second flow of coolant 88.

In the refrigerant circuit 42, the condition of the supply airflow 68, such as temperature, flow rate and relative humidity, of the supply airflow 68 greatly impacts performance of the refrigerant circuit 42 and conditioning of the passenger compartment 20. For accurate and efficient control operation of the refrigerant circuit 42 to provide conditioning of the passenger compartment 20, the level of relative humidity must be either measured or estimated. In vehicles 10 without a direct relative humidity sensor, it is necessary to estimate the relative humidity. Herein, the relative humidity is estimated utilizing one or more refrigerant pressure sensors 106 and one or more refrigerant temperature sensors 108. The sensor data is utilized with a 2-zone moving boundary refrigerant dynamic model and a Kalman filter to provide the estimation of relative humidity.

Figure 3:
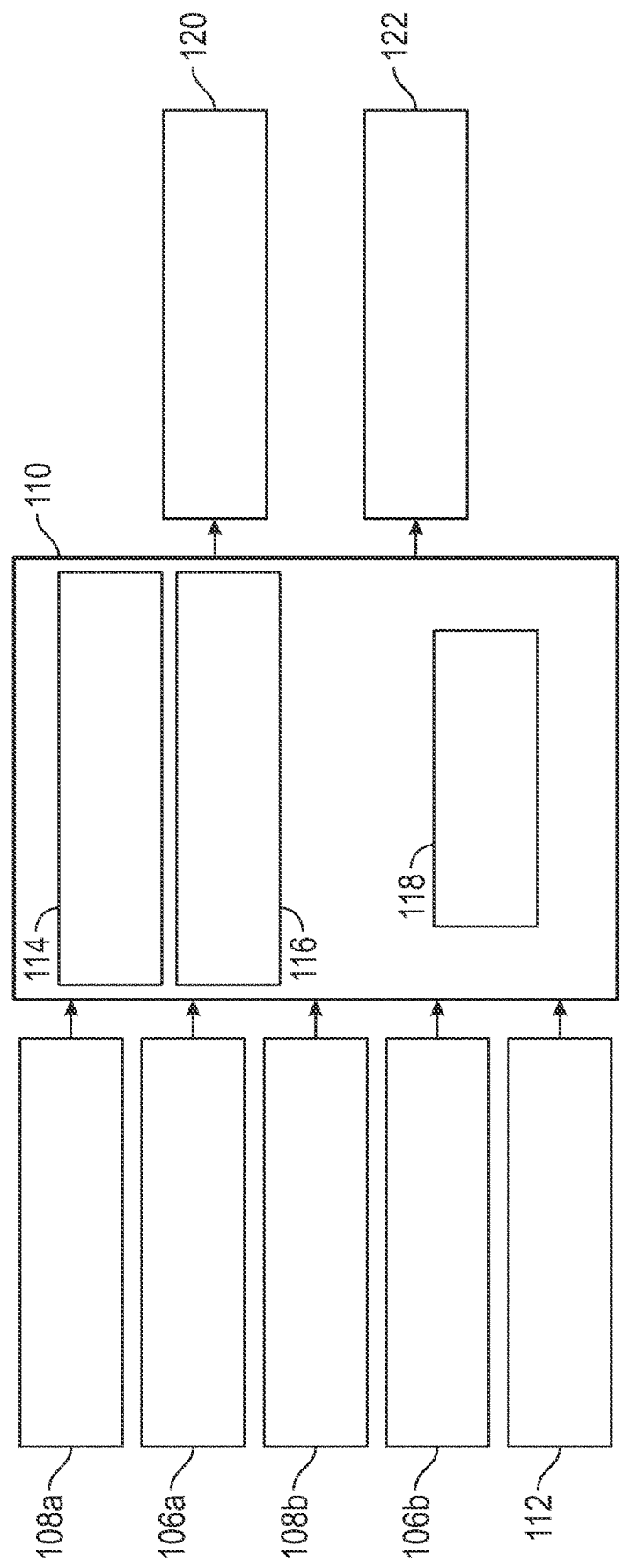
FIG. 3 is a schematic illustration of an embodiment of humidity and temperature estimation by the cooling system.

A schematic illustration of this estimation is shown in FIG. 3, with continued reference to FIG. 2. A refrigerant circuit controller 110 receives input from multiple sources, such as an evaporator outlet refrigerant temperature sensor 108a, an evaporator outlet refrigerant pressure sensor 106a, an ambient temperature sensor 108b, an ambient pressure sensor 106b, and a refrigerant mass flow sensor 112. The refrigerant circuit controller 110 passes this input through a 2-zone moving boundary refrigerant dynamic model 114 and a 2-zone static model 116 with humidity condensation. The model results are filtered utilizing a Kalman filter 118, and an estimated ambient relative humidity 120 and an estimated supply airflow 68 temperature 122 exiting the evaporator 54. Based on the estimated ambient humidity, the refrigerant circuit controller 110 may change operation of one or more components of the refrigerant circuit 42, such as the compressor 42, expansion device 124 and/or the blower 70 to provide the requested level of conditioning to the passenger compartment 20 via the supply airflow 68.

In some embodiments, the 2-zone moving boundary refrigerant dynamic model includes:

$$\left[\frac{\partial \rho_g}{\partial p}\left(\bar{\gamma} - \frac{L_2}{L_{total}}\right) + \frac{\partial \rho_f}{\partial p}(1-\bar{\gamma})\right]AL_{total}\dot{p} + (\rho_g - \rho_f)AL_{total}\dot{\bar{\gamma}} =$$

$$\dot{m}_{in} - \dot{m}_{int1}\left[\frac{\partial(\rho_g h_g)}{\partial p}\left(\bar{\gamma} - \frac{L_2}{L_{total}}\right) + \frac{\partial(\rho_f h_f)}{\partial p}(1-\bar{\gamma}) - \frac{L_1}{L_{total}}\right]AL_{total}\dot{p} + (\rho_g h_g - \rho_f h_f)AL_{total}\dot{\bar{\gamma}} =$$

$$h_{in}\dot{m}_{in} - h_{int}\dot{m}_{int} + HA_{r2a_1}\frac{L_1}{L_{total}}\left(T_{a1_{aver}} - T_{r_{sat}} - \Delta\right)$$

$$T_{crc}\left[\left[\frac{\partial \rho_{sup}}{\partial p}\frac{L_2}{L_{total}} - (\rho_2 - \rho_g)\frac{\dot{\bar{\gamma}}_c}{1-\bar{\gamma}_c}\left(1-\frac{L_2}{L_{total}}\right)\right]\dot{p} + (\rho_2 - \rho_g)\frac{\dot{\bar{\gamma}}_c}{1-\bar{\gamma}_c} + \frac{\partial \rho_{sup}}{\partial h}\frac{L_2}{L_{total}}h_2\right]AL_{total} =$$

$$\dot{m}_{int} - \dot{m}_{out}\left[\left[\left(\frac{\partial \rho_{sup}}{\partial p}h_2 - 1\right)\frac{L_2}{L_{total}} - (\rho_2 h_2 - h_g \rho_g)\frac{\dot{\bar{\gamma}}_c}{1-\bar{\gamma}_c}\left(1-\frac{L_2}{L_{total}}\right)\right]\dot{p} + (\rho_2 h_2 - h_g \rho_g)\frac{\dot{\bar{\gamma}}_c}{1-\bar{\gamma}_c} +$$

$$\left(\frac{\partial \rho_{sup}}{\partial h}h_2 + \rho_2\right)h_2\frac{L_2}{L_{total}}\right]AL_{total} = h_{int}\dot{m}_{int} - h_2\dot{m}_{out} + HA_{r2a_2}\frac{L_2}{L_{total}}\left(T_{a2_{aver}} - T_{r2_{aver}}\right)$$

This 2-zone moving boundary refrigerant model is based on conservation of mass and conservation of energy for different zones. The first zone is a 2-phase zone of the evaporator 54, where there is phase change occurring, while the second zone is the superheat region of the evaporator 54, downstream of the 2-phase first zone where the phase of the refrigerant 46 is all vapor. Both conservation of mass and energy are applied to each zone, leading to the four exemplary equations shown above.

In some embodiments, the 2-zone static model with humidity condensation includes:

$$H_{a2r_1}A_s(T_{a1_{aver}} - T_{r_{Sat}-\Delta T_{crc}}) =$$

$$\dot{m}_{blwr}\left((T_{a_{in}} - T_{a1})(Cp_a + w_{amb}Cp_w) + (w_{amb} - w_{ec_1})LH_w\right)$$

$$H_{a2r_2}A_s(T_{a2_{aver}} - T_{r2_{aver}}) =$$

$$\dot{m}_{blwr}\left((T_{a_{in}} - T_{a2})(Cp_a + w_{amb}Cp_w) + (w_{amb} - w_{ec\_2})LH_w\right)$$

$$\dot{w}_{amb} = 0$$

These 2-zone static air models come from conservation of energy of the supply airflow 68 traveling over the first zone as well as second zone, hence two equations. The left-hand side terms are related to convective heat transfer, while the right hand side terms are related to the enthalpy in and out change. The air is assumed to be at steady state (no energy storage).

Further, in some embodiments, the air temperature of the supply airflow 68 leaving the evaporator is estimated via this sequence of operations by the refrigerant circuit controller 110:

$$H_{a2r_1}A_s(T_{a1_{aver}} - T_{r_{Sat}}) =$$

$$\dot{m}_{blwr}\left((T_{a_{in}} - T_{a1})(Cp_a + w_{amb}Cp_w) + (w_{amb} - w_{ec_1})LH_w H_{a2r_1}A_s\left(\frac{T_{a1} + (\alpha - 1)T_{a_{in}}}{\alpha} - T_{r_{Sat}}\right)\right) =$$

$$\dot{m}_{blwr}\left((T_{a_{in}} - T_{a1})(Cp_a + w_{amb}Cp_w) + (w_{amb} - (c_1T_{a1}^2 + c_2T_{a1} + c_3))LH_w\right)$$

$$(T_{a1} + (\alpha - 1)T_{a_{in}} - \alpha T_{r_{Sat}}) =$$

$$\frac{\dot{m}_{blwr}\alpha}{\alpha H_{a2r\_1}A_s}\left((T_{a_{in}} - T_{a1})(Cp_a + w_{amb}Cp_w) + (w_{amb} - (c_1T_{a1}^2 + c_2T_{a1} + c_3))LH_w\right)$$

$$A = c_1\frac{\dot{m}_{blwr}\alpha}{\alpha H_{a2r\_1}A_s}LH_w$$

$$B = 1 + \frac{\dot{m}_{blwr}\alpha}{\alpha H_{a2r_1}A_s}(Cp_a + w_{amb}Cp_w + c_2LH_w)$$

$$C = (\alpha - 1)T_{a_{in}} - \alpha T_{r_{Sat}} - \frac{\dot{m}_{blwr}\alpha}{\alpha H_{a2r_1}A_s}\left(-T_{a_{in}}(Cp_a + w_{amb}Cp_w) + c_3LH_w - w_{amb}\right)$$

$$AT_{a1}^2 + BT_{a1} + C = 0$$

$$T_{a1} = \frac{-B +/- \sqrt{B^2 - 4AC}}{2A}$$

$$w_{ec\_1} = c_1T_{a1}^2 + c_2T_{a1} + c_3$$

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a cooling system of a vehicle, comprising:
   measuring a refrigerant pressure and a refrigerant temperature of a flow of refrigerant in a refrigerant circuit of the cooling system;
   estimating a relative humidity of a supply airflow across an evaporator of the refrigerant circuit utilizing the measured refrigerant pressure and the measured refrigerant temperature; and
   changing operation of one or more components of the refrigerant circuit as a result of the estimated relative humidity;
   wherein the relative humidity is estimated utilizing a 2-zone moving boundary refrigerant dynamic model.

2. The method of claim 1, further comprising filtering results of the refrigerant dynamic model via a Kalman filter.

3. The method of claim 1, further comprising estimating a supply airflow temperature at the evaporator.

4. The method of claim 3, further comprising estimating the supply airflow temperature via a 2-zone static air model with humidity condensation.

5. The method of claim 1, wherein:
   the measured refrigerant pressure is an evaporator outlet pressure; and
   the measured refrigerant temperature is an evaporator outlet temperature.

6. The method of claim 1, further comprising utilizing one or more of ambient air temperature, ambient air pressure or refrigerant flow rate in the estimating of relative humidity.

7. The method of claim 1, wherein the one or more components include one or more of a compressor, an expansion device, a blower or a condenser fan.

8. The method of claim 1, wherein the cooling system further comprises a chiller disposed along the refrigerant circuit, the chiller fluidly connected to a coolant circuit configured to condition a rechargeable energy storage system.

9. The method of claim 8, wherein operation of one or more components of the coolant circuit is changed in response to the estimated relative humidity.

10. A cooling system of a vehicle, comprising:
    a refrigerant circuit having a flow of refrigerant circulating therethrough, the refrigerant circuit including:
    a compressor;
    an evaporator;
    one or more refrigerant pressure sensors; and
    one or more refrigerant temperature sensors;
    a refrigerant circuit controller operably connected to the refrigerant circuit, the refrigerant circuit controller configured to:
    estimate a relative humidity of a supply airflow across the evaporator utilizing a measured refrigerant pressure and a measured refrigerant temperature; and
    change operation of one or more components of the refrigerant circuit as a result of the estimated relative humidity;
    wherein the refrigerant circuit controller is configured to estimate the relative humidity utilizing a 2-zone moving boundary refrigerant dynamic model.

11. The cooling system of claim 10, wherein the refrigerant circuit controller is configured to filter the results of the refrigerant dynamic model via a Kalman filter.

12. The cooling system of claim 10, wherein the refrigerant circuit controller is configured to estimate a supply airflow temperature at the evaporator.

13. The cooling system of claim 12, wherein the refrigerant circuit controller is configured to estimate the supply airflow temperature via a 2-zone static air model with humidity condensation.

14. The cooling system of claim 10, wherein:
    the measured refrigerant pressure is an evaporator outlet pressure; and
    the measured refrigerant temperature is an evaporator outlet temperature.

15. The cooling system of claim 10, wherein the refrigerant circuit controller is configured to utilize one or more of ambient air temperature, ambient air pressure or refrigerant flow rate in the estimating of relative humidity.

16. The cooling system of claim 10, wherein the one or more components include one or more of the compressor, an expansion device, a blower or a condenser fan.

17. The cooling system of claim 10, wherein the cooling system further comprises a chiller disposed along the refrigerant circuit, the chiller fluidly connected to a coolant circuit configured to condition a rechargeable energy storage system.

18. The cooling system of claim 17, wherein operation of one or more components of the coolant circuit is changed in response to the estimated relative humidity.

* * * * *